No. 673,393. Patented May 7, 1901.
A. GANS.
DRYING AND VENTILATING APPARATUS.
(Application filed Jan. 19, 1901.)
(No Model.)
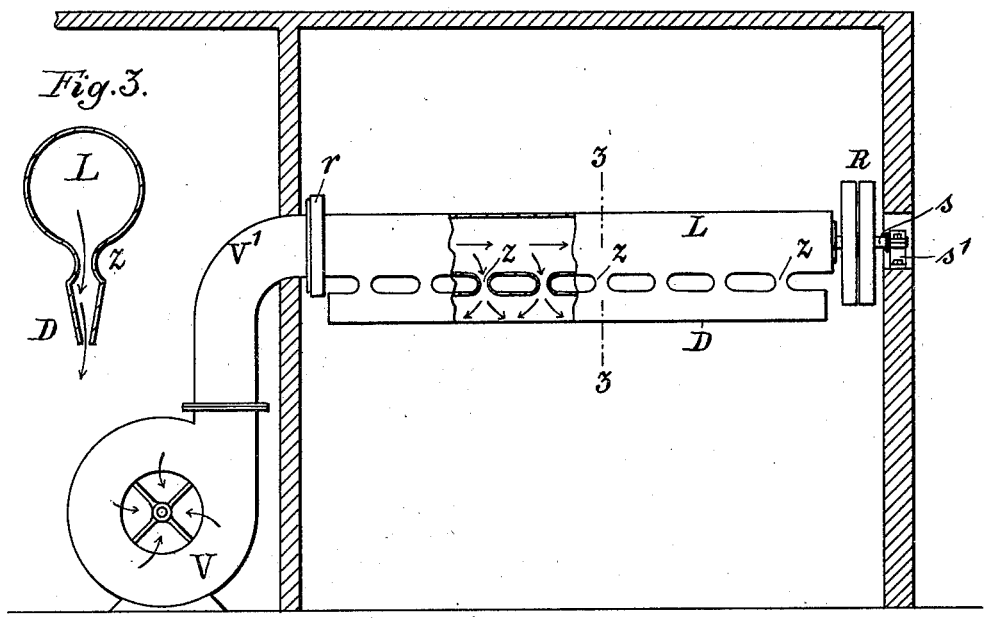
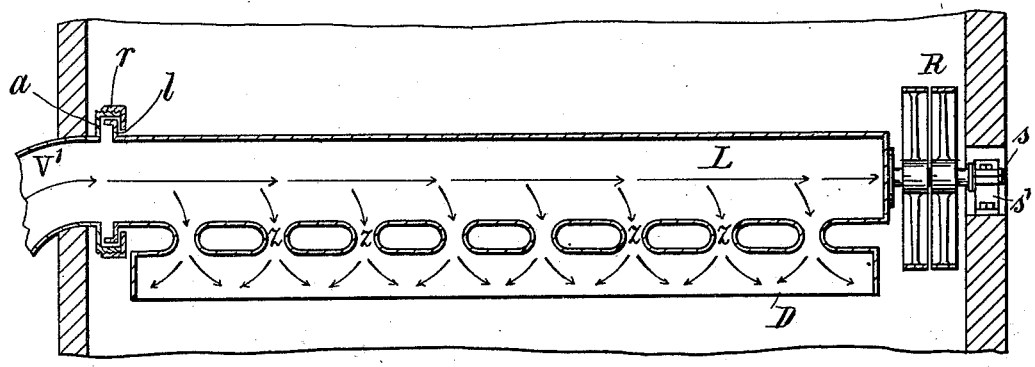
Witnesses:
John A. Paulson
M. A. Helmke
Albert Gans
Inventor
by Schreiter & Mathews
his Att'ys

UNITED STATES PATENT OFFICE.

ALBERT GANS, OF KEMMELBACH, AUSTRIA-HUNGARY.

DRYING AND VENTILATING APPARATUS.

SPECIFICATION forming part of Letters Patent No. 673,393, dated May 7, 1901.

Application filed January 19, 1901. Serial No. 43,913. (No model.)

*To all whom it may concern:*

Be it known that I, ALBERT GANS, of Kemmelbach, Lower Austria, Empire of Austria-Hungary, have invented certain new and useful Improvements in Drying and Ventilating Apparatus, of which the following is a full, clear, and exact specification, reference being had to the accompanying drawings, wherein—

Figure 1 is a front elevation partly-sectional view of an air forcing and distributing apparatus, showing my invention applied thereto. Fig. 2 is a similar view showing the rotary distributing-pipe in horizontal position and the bearing connecting it with the stationary blowpipe in section, and Fig. 3 is an enlarged cross-sectional view of the rotary distributing-pipe.

My invention relates to drying and ventilating appliances; and it consists of the hereinafter-described device for distributing hot or cold and dry or moist air into a chamber or compartment where such air is required for various purposes.

In describing the construction and use of my device I have taken in view its employment for distributing hot dry air to a drying-room, as is used in many industries; but this is not the only use to which my invention may be applied. The device, as shown and described, is equally well adapted for cooling, ventilating, or for dampening, as well as for disinfecting and other analogous purposes.

The apparatus shown in the drawings and wherein my distributing-pipe is used as a part thereof consists of an ordinary force-blower V, which is preferably located in a compartment where the air or other fluid to be used is being prepared—to wit, dried, heated, cooled, moistened, or otherwise prepared—though the blower may as well be located elsewhere and connected with the compartment or with some apparatus where the air or other fluid is being prepared by means of a suction-pipe; the stationary pipe V', connected with the blower; the rotary pipe L, provided with nozzle D and shaft $s$, rigidly secured to the outer end thereof, and belt-pulleys R or some other mechanism for rotating the pipe L.

My invention consists in the construction of the rotary pipe L, which I designate as the "distributing" device of the apparatus and of the manner of combining it with the blowpipe V' and with the mechanism for rotating it.

The rotary pipe L is shown in the sectional view, Fig. 3. It is open on one end—the one joined to blowpipe V'—and closed on the other and is provided with a flat-mouthed nozzle D, extending its entire length and communicating with the interior of the pipe L by way of throttle-necks $z$. Pipe L is made preferably integral with the nozzle D and in sections of convenient length, which may be connected by flanges or by merely telescoping or soldering them together. The throttle-necks $z$ are devised to prevent a forcible blow of air from the nozzle at the near end of the pipe L (adjoining the connection with blowpipe V') and corresponding deficiency at the other. They serve to reduce, equalize, and distribute the pressure of the air throughout the entire length of the nozzle.

The open terminus of the distributing rotary pipe L is joined to the terminus of blowpipe V', and to its other closed terminus shaft $s$ is rigidly secured by any suitable means. The shaft is mounted in standard $s'$, and belt-pulleys R, one loose and the other keyed to the shaft, are mounted thereon. These pulleys are connected by a belt to a power-transmission or counter shaft, imparting thereto a rotary motion, and by means thereof the distributing-pipe L is slowly rotated.

The joint connecting the rotary distributing-pipe L to the stationary pipe V' is formed of flange $a$, provided on the terminus of the blowpipe V', and flange $l$, provided on the rotary pipe L, the latter-mentioned flange being fitted into the former, and the joint is preferably though not necessarily closed by flanged ring $r$, screwed upon the outer flange $a$ to secure the connection.

The apparatus is preferably set in the position relatively to the walls, floor, and ceiling of the room wherein it is to be used as shown in the drawings. In this position of the apparatus the pipe L when in motion distributes the air in all parts of the room and at the same time creates a rotary current slowly but steadily traversing the room along the parallel walls and the floor and ceiling. This current is constantly driven and reinforced by the current of air emanating from the nozzle.

I am aware that various devices are in use for driving and distributing of hot air in drying-rooms, kilns, and the like; but this desired effect of producing a current steadily circulating along the walls and floor and ceiling was to my best knowledge and belief not attained by any of the heretofore-known devices, except when two or more of such devices were employed in series, and even in such cases the flow of the current is not maintained uniform in force and velocity.

Another advantage of my device is that it permits the installation of the blower and its driving mechanism entirely outside of the room wherein the air or other fluid is to be used and the closing of all connections between the place where the air and other fluid is being prepared and the room or compartment where it is used. This possibility is a great desideratum in many industries where such apparatus is used.

I claim as my invention and desire to secure by Letters Patent—

1. A rotary distributing-pipe open on one end and closed on the other, and provided with a longitudinal nozzle communicating with the interior thereof by throttling-necks connecting the nozzle to the pipe, means for connecting the distributing-pipe to an air-forcing apparatus and means for rotating it.

2. The combination with an air-forcing apparatus of a discharging-pipe secured thereto, open on one end and closed on the other, and provided with a longitudinal nozzle communicating with the interior thereof by throttling-necks connecting the nozzle to the pipe.

3. The combination with an air-forcing apparatus, of a discharging-pipe rotatably secured thereto, open on one end and closed on the other, and provided with a longitudinal nozzle communicating with the interior thereof and extending the whole length of the pipe, and of means for rotating the discharging-pipe.

ALBERT GANS.

Witnesses:
GOTTLIEB HITZ,
HERRMAN KOHN.